UNITED STATES PATENT OFFICE.

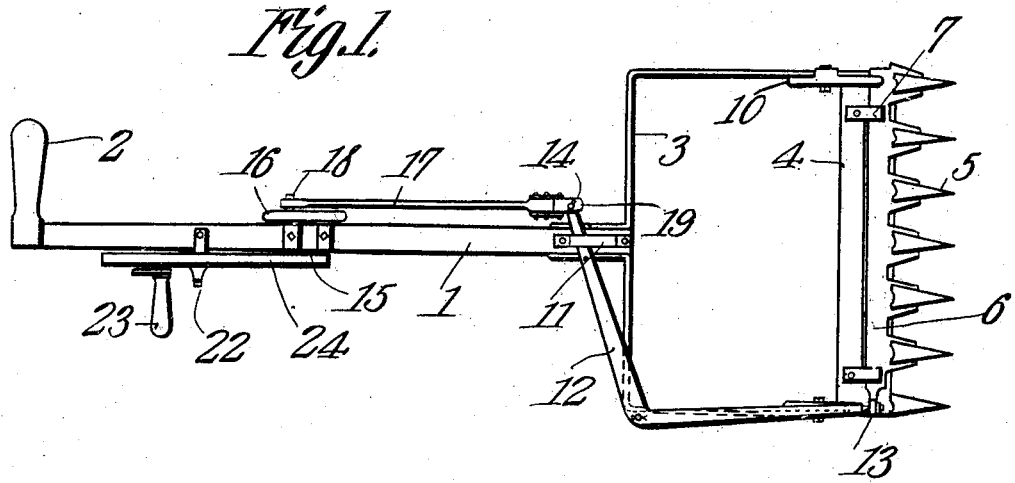

NOAH WALKER, OF NEWKIRK, OKLAHOMA.

LAWN-MOWER.

937,977.

Specification of Letters Patent.   Patented Oct. 26, 1909.

Application filed June 17, 1909.   Serial No. 502,833.

*To all whom it may concern:*

Be it known that I, NOAH WALKER, a citizen of the United States, residing at Newkirk, in the county of Kay and State of Oklahoma, have invented a new and useful Lawn-Mower, of which the following is a specification.

This invention has relation to lawn mowers, and it consists in the novel construction and arrangement of its parts as hereinafter shown and described.

The object of the invention is to provide a manually-propelled lawn mower, which is equipped with a reciprocating knife, also adapted to be manually operated.

With the above object in view the mower includes a yoke mounted upon wheels which are adjustably positioned thereon and to which is attached a cutter-bar. A sickle bar is mounted for reciprocation upon the cutter-bar and a bell-crank lever is fulcrumed upon the yoke and is operatively connected with the said sickle-bar. A handle beam is attached to the yoke and is provided with a guide which receives one end of the said bell-crank lever. An actuating shaft is journaled upon the handle beam and is provided with a fly-wheel to which is pivotally connected one end of the pitman, the other end of the said pitman being pivotally connected with the said bell-crank lever. Means is provided for rotating the said shaft.

In the accompanying drawings:—Figure 1 is a plan view of the lawn mower. Fig. 2 is a side elevation of the same. Fig. 3 is a detail perspective view of the adjoining ends of the bell-crank lever and the pitman.

The lawn mower consists of a handle-beam 1, which is provided at one end with a grip 2, and which is attached at its other end to a yoke 3. A cutter-bar 4 is supported at the forward end of the yoke 3, and fingers 5 are mounted upon the said bar 4. A sickle-bar 6 is mounted for reciprocation upon the cutter-bar 4 and is held in position thereon by means of guides 7. The yoke 3 is provided in its sides and in the vicinity of its forward end with the series of perforations 7'. Supporting wheels 8 are journaled upon pins 9, and the said pins are adapted to be adjustably mounted in the perforations 7' of the said yoke. A shield 10 (preferably of sheet metal) is located over each of the supporting wheels 8 and is held in position by the pins 9 of the said wheels.

A guide 11 is mounted upon the upper side of the handle beam 1 in the vicinity of its point of attachment with the yoke 3. A bell-crank lever 12 is fulcrumed to one side of the yoke 3, and the working end of the said lever is pivotally connected with the end of the sickle-bar as at 13. The power end portion of the said bell-crank lever lies under the guide 11 and upon the upper surface of the handle-beam 1, and the extremity of the power end of the bell-crank lever 12 projects beyond the side of the said handle-beam 1. At its power end the said bell crank lever 12 is provided with an upstanding pin 14. A power shaft 15 is journaled for rotation upon the handle-beam 1, and a fly-wheel 16 is fixed to the said shaft.

A pitman 17 is pivoted at one end to a wrist-pin 18, carried by the fly-wheel 16, and at its other end the said pitman 17 is provided with a pivoted block 19 which in turn is provided with a perforation which pivotally receives the upstanding pin 14 upon the power end of the bell-crank lever 12. At that end of the shaft 15 opposite the end thereof upon which the fly-wheel 16 is mounted is located a relatively small gear-wheel 20, which meshes with a relatively large gear-wheel 21. The said gear-wheel 21 is journaled upon a pin 22 which projects laterally from the side of the handle-beam 1, and the said gear-wheel 21 is provided with a crank handle 23. The wheels 20 and 21 are protected by a shield 24, which is supported by the handle beam 1.

From the above description it is obvious that as the lawn-mower is manually propelled toward standing vegetation that one hand may be used for propelling the mower, while the other hand may be used for rotating the crank handle 23 about the axis of the gear wheel 21. Thus the said gear wheel is rotated, and a rotary movement is transmitted from the same to the shaft 15 through the intermeshing wheel 20. As the shaft 15 rotates longitudinal movement is imparted to the pitman 17, which, in turn, rocks the lever 12 upon its fulcrum. As the said lever 12 rocks as described reciprocatory movement is transmitted to the sickle-bar 6 and the sickle-blades carried thereby coöperate with the cutter-bar 4 and the fingers mounted thereon and sever the standing vegetation. Inasmuch as the wheels 8 are adjustably connected with the yoke 3, means is provided for elevating or lowering the said yoke with relation to the surface of the ground, whereby the vegetation may be cut at any desired distance from the surface of the ground. It will also be seen that inasmuch as the pitman 17 is joined with the power end of the rocker lever 12 by means of a universal joint connection or a connection approaching such, in order to prevent the parts from buckling at such points, and also to cause the rocker lever 12 to move positively as the said pitman 17 reciprocates, the guide 11 will prevent any tendency to upward movement on the part of the power end of the lever 12, and will also assist the guide 7 in maintaining the sickle-bar 6 in position against the cutter-bar 4 and the fingers 5.

Having described my invention, what I claim as new, and desire to secure, by Letters Patent, is:—

A lawn mower comprising a handle beam, a yoke attached thereto, a cutter-bar carried by the yoke, supporting wheels adjustably attached to the sides of the yoke, shields located over the wheels and supported upon the yoke, a sickle-bar mounted for reciprocatory movement upon the cutter-bar, a rocker lever fulcrumed to the yoke and pivotally connected with the sickle-bar, a shaft journaled for rotation upon the handle-beam, a pitman operatively connected with said shaft for reciprocatory movement, means for rotating the said shaft, and a block pivotally connected with the pitman and having pivotal connection with the power end of the said rocker lever.

In testimony that I claim the foregoing as my own, I have hereto affixed my signature in the presence of two witnesses.

NOAH WALKER.

Witnesses:
J. WENDELL SMITH,
P. W. SMITH.